3,734,969
Patented May 22, 1973

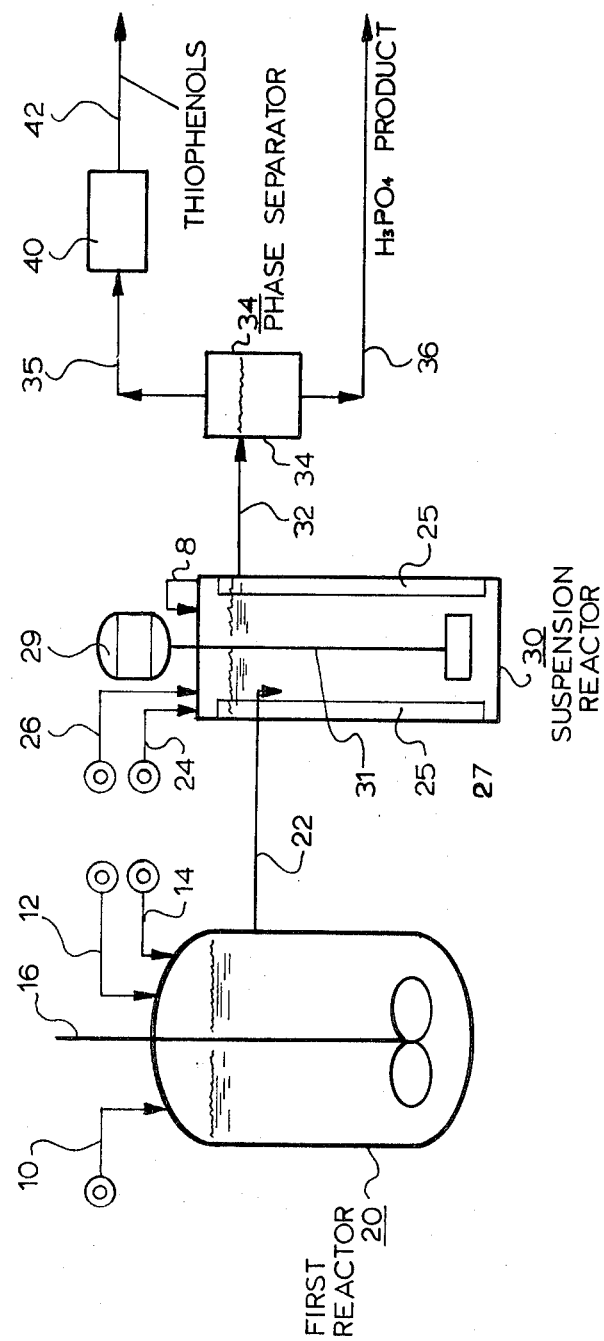

3,734,969
MANUFACTURE OF THIOPHENOL
Harold M. Pitt, Lafayette, Calif., assignor to Stauffer
Chemical Company, New York, N.Y.
Continuation-in-part of application Ser. No. 750,314,
Aug. 5, 1968. This application June 11, 1969, Ser.
No. 834,232
Int. Cl. C07c 149/32
U.S. Cl. 260—609 D                                      6 Claims

ABSTRACT OF THE DISCLOSURE

A process for producing thiophenols is described herein. The process involves reacting aromatic sulfonic acid and elemental phosphorus in the presence of the catalyst in the first reaction zone. Thereafter the reaction product is transferred to a second zone wherein water is added thereto to maintain the composition of the aqueous phase at between about 86–96% $H_3PO_4$. The thiophenol is then separated from the aqueous phase containing phosphoric acid.

CROSS REFERENCE

This application is a continuation-in-part of application Ser. No. 750,314, filed Aug. 5, 1968 for Manufacture of Thiophenol now abandoned.

SPECIFICATION

This invention relates to a process for the production of thiophenols, and more particularly, it relates to the process for producing thiophenols by the reduction of aryl sulfonic acids with elemental phosphorus using iodine as a catalyst. Still more particularly, this invention relates to an improved and more highly efficient process for the production of thiophenols.

In accordance with U.S. Pat. 2,947,788 and commercial practice, thiophenols are produced by the reduction of aryl sulfonic acids with elemental phosphorus using iodine for the catalyst. The reaction, according to the prior art, can be conducted at any temperature from about 80° C. to 225° C. The reaction is preferably conducted into two stages in order to achieve desired control over the reaction. According to U.S. patent mentioned above, the following reaction occurs in the first stage.

(1)  $2RSO_3H + 2P \rightarrow (RS)_2 + 2HPO_3$ 

wherein R is aryl. This reaction is maintained at a temperature preferably between 80–100° C., and an iodine containing catalyst is employed. When Reaction 1 is complete, the liquid reaction mass is transferred to a second stage reaction. Water is added to bring the boiling point of the solution, e.g., to 155° C. Molten white phosphorus is added in the quantity required by the following equation.

(2)  $5(RS)_2 + 2P + 8H_2O \rightarrow 10RSH + 2H_3PO_4$ 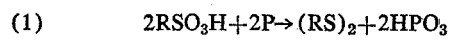

The reaction proceeds, according to the prior art, as illustrated by Reaction 2.

While it is apparent that the composition present in the second reaction stage reacts largely as indicated by Equation No. 2, it is also apparent that certain undesirable and previously unidentified side-products are formed in the second reaction stage. It is known from the prior art and practice that the thiophenols produced in the second reaction stage must be separated from the undesirable materials by steam distillation or solvent extraction. Solvent extraction is impracticable on a commercial scale and steam distillation is expensive to operate and maintain. While the thiophenols which are recovered overhead from the steam distillation zone, make a suitable product after being subjected, e.g., to a further vacuum distillation, the phosphoric acid recovered from the bottom of the steam distillation zone is found to be contaminated with various organic materials, which make it unsuitable for most commercial uses.

It is therefore the principal object of the present invention to overcome and eliminate the disadvantages inherent in the prior art processes for making thiophenols.

Another object of the present invention is to provide a novel and more efficient process for making thiophenols.

Another object of the present invention is to provide a process for the production of thiophenols and commercial grade phosphoric acid.

Other objects and advantages will become apparent from the following description and disclosure.

The present invention is predicated on the discovery that under the conditions of reaction maintained in the second reaction stage, the following reaction occurs:

(3)  $3(RS)_2 + 2P \rightarrow 2(RS)_3P$ 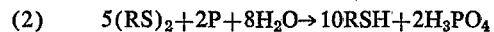

The product of Reaction 3 is decomposed during the steam distillation, producing additional thiophenol plus phosphorus acid which undergoes still further decomposition. These decomposition products are removed together with the phosphoric acid from the lower part of the steam distillation zone. It has now been found that the production of undesirable side-products can be substantially eliminated by dispersing the organic phase in the aqueous phase present in the second stage reaction zone, thereby achieving intimate contact between the two reaction phases while maintaining a composition in the aqueous phase of between 86–96% $H_3PO_4$, preferably 86–92%, and a temperature between about 90–170° C. and preferably between about 100 and 140° C. When these essential conditions are maintained, Reaction 3 is substantially eliminated. The liquid material is withdrawn from the second stage reaction zone and permitted to separate into two distinct phases, which are thereafter separated The organic phase contains crude thiophenols, which may be further purified by vacuum distillation or other suitable means, and the aqueous phase contains aqueous phosphoric acid.

Reference is now made to the figure of the drawing, which illustrates diagrammatically in elevation one preferred embodiment of the process of the present invention. The figure of the drawing is described with reference to numerical Example No. 1 of the operation.

Referring to the drawing, into the first reactor is continuously charged as follows: line 10, 22.8 lbs./hr. of iodine; line 12, 600 lbs./hr. of benzene sulfonic acid; and, line 14, 118 lbs./hr. of molten white phosphorus. The temperature of the first reaction zone is maintained at about 110–130° C. and the reaction is carried continuously. The reaction mixture is stirred by means of 16.

The liquid reaction mass in reactor 20 overflows via conduit 22 into suspension reactor 30. Sufficient water is added in line 24 to bring the composition of the aqueous phase to a concentration of 86–92% $H_3PO_4$. About 19 lbs./hr. of white phosphorus is added in line 26. Reflux condenser 28 is provided to maintain the desired temperature in reactor 30 although cooling may be done in other ways.

Reactor 30 is designed to disperse the organic liquid to produce relatively small droplets which remain suspended in the aqueous liquid present in the reaction zone. This invention is not limited to any particular method of achieving such suspension; methods and means for which purpose are known to those skilled in the art. In this example, reactor 30 comprises a vertically elongated zone containing a plurality of spaced apart baffles 25 attached to the inner wall thereof. Paddle 27 extends into the lower portion of reactor 30. Paddle 27 is connected to motor 29 thru shaft 31, and provides means for achieving dispersion and suspension in combination with baffles 25. In this example, shaft 31 is rotated at about 1750 r.p.m. employing a 7½ horsepower motor.

After the reaction in 30 has proceeded to the desired stage, the reaction effluent is withdrawn in conduit 32 to phase separator 34. Any suitable phase separator can be employed which provides sufficient opportunity for the organic material suspended in the aqueous reaction effluent to separate into two distinct phases. The organic phase comprises crude thiophenol and is withdrawn in conduit 35. The crude thiophenol may be further purified by vacuum distillation in unit 40 and withdrawn as high purity, e.g., 99+% thiophenol product in line 42.

The aqueous phase is separated in line 36 and comprises phosphoric acid between about 62–65% by weight $P_2O_5$. Additionally, the phosphoric acid contains about 1–2% by weight hydrogen iodide and about 1–3% by weight organics. Acid recovered from a steam distillation zone contains about 4–10% organics and must be passed to waste.

EXAMPLES 2-5

Other thiophenols can be made in the manner specified in the previous example starting with the appropriate aromatic sulfonic acid. In a manner as described in the previous example corresponding thiophenols are made starting with parachlorobenzenesulfonic acid, 2-naphthalenesulfonic acid, 2,4,5-trichlorobenzenesulfonic acid, and methylbenzenesulfonic acid.

EXAMPLE 6

100 ml. of 86% $H_3PO_4$ and 18.5 g. of $P_2O_5$ were mixed and heated to 90° C. to insure reaction. Then a mixture of 107.8 (100 mls.) g. of thiophenol and 20 g. of diphenyl disulfide were added. 4 mls. of 57% HI were added as catalyst. The theoretical quantity of white phosphorus (1.8 g.) for the reduction of the disulfide was added and the two phase system agitated at 100° C. Following this the system was heated to 140° C. but analysis both before and after this heating indicated that reduction was completed at 100° C.

EXAMPLE 7

167 g. of 86% $H_3PO_4$ and 18.5 g. $P_2O_5$ reacted to form 185.5 g. of 91% $H_3PO_4$. To this was added 166 g. of thiophenoldisulfide mixture (81.1% thiophenol-18.9% diphenyl disulfide) and 4 mls. 57% HI. White phosphorus was added and the mixture agitated at 133° C. for two or three minutes and by analysis the reaction was complete.

Having thus described the invention with reference to specific examples thereof, many modifications and alterations have become apparent to those skilled in the art without departing from the spirit and scope thereof.

What is claimed is:

1. A process for making thiophenols which comprises reacting aromatic sulfonic acid and elemental phosphorus in the presence of an iodine catalyst in a first reaction zone, transferring at least a portion of the product of the first reaction zone to a second zone, adding water to said second reaction zone to adjust the composition of the aqueous phase to between about 86 and 96% $H_3PO_4$, maintaining the temperature between about 90 and 170° C., adding at least the stoichiometric requirement of phosphorus, maintaining intimate contact between the organic phase and the aqueous phase during reaction in said second reaction zone, passing the product of the second reaction zone to a suitable phase separation zone, separating an organic phase comprising a thiophenol and an aqueous phase containing phosphoric acid.

2. The process of claim 1 in which water is added to obtain a composition having a concentration of between about 86 and 92% $H_3PO_4$.

3. The process of claim 1 in which said aromatic sulfonic acid comprises parachlorobenzene sulfonic acid.

4. The process of claim 1 in which said aromatic sulfonic acid comprises 2,4,5-trichlorobenzene sulfonic acid.

5. The process of claim 1 in which said aromatic sulfonic acid comprises methyl benzene sulfonic acid.

6. The process of claim 1 in which said aqueous suspension and organic liquid is produced and maintained by agitation of the product of the first reaction zone in a confined internally baffled second reaction zone.

References Cited

UNITED STATES PATENTS 2,947,788   8/1960   Pitt _____ 260—609 D

LEWIS GOTTS, Primary Examiner

D. R. PHILLIPS, Assistant Examiner

U.S. Cl. X.R.

260—608, 971